May 14, 1957  J. W. THROCKMORTON ET AL  2,791,987
MULTI-COIL HEAT CONTROL FURNACE
Filed June 23, 1955  2 Sheets-Sheet 1
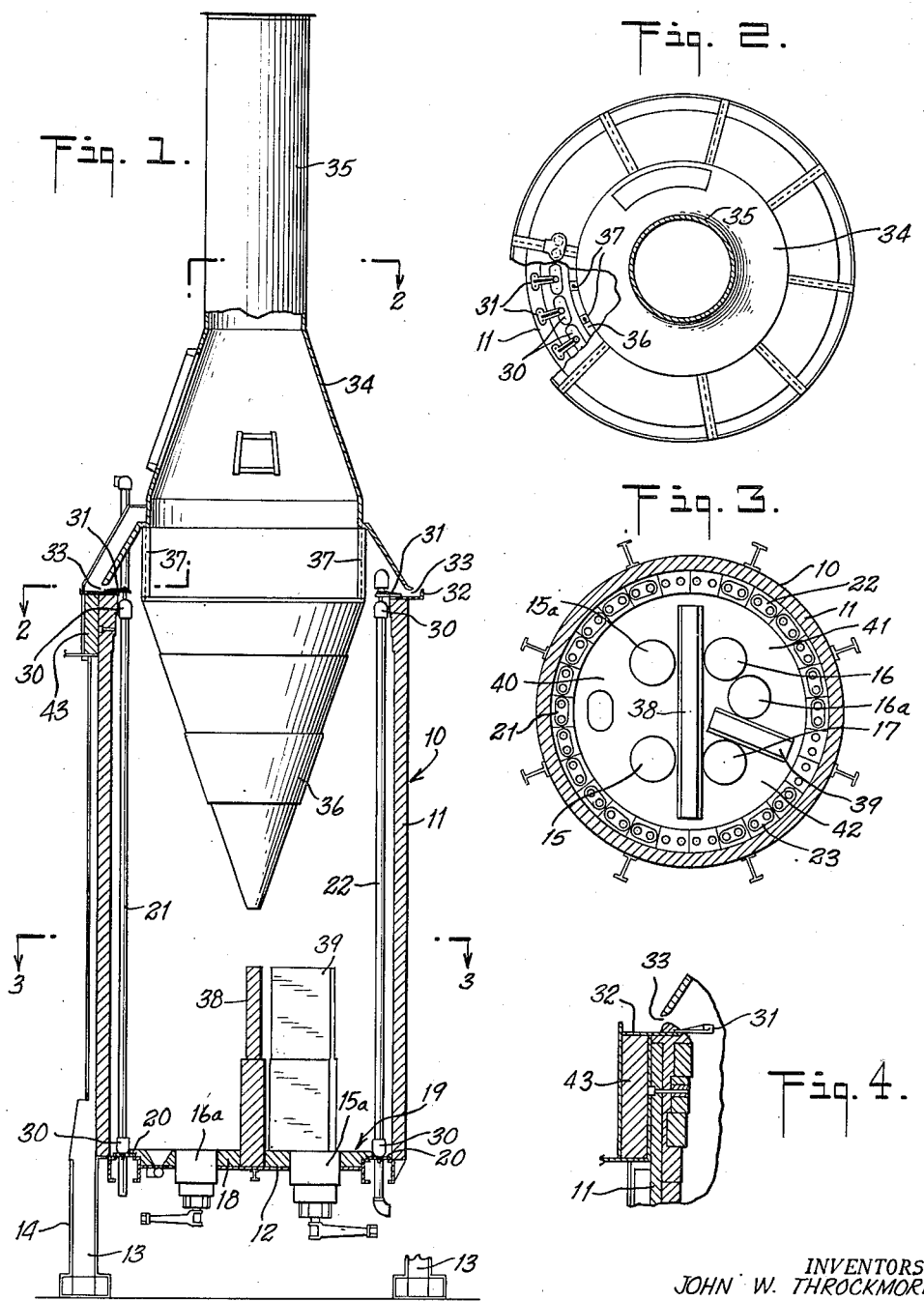
INVENTORS
JOHN W. THROCKMORTON
JOHN S. WALLIS
BY
R. J. Dearborn
ATTORNEY

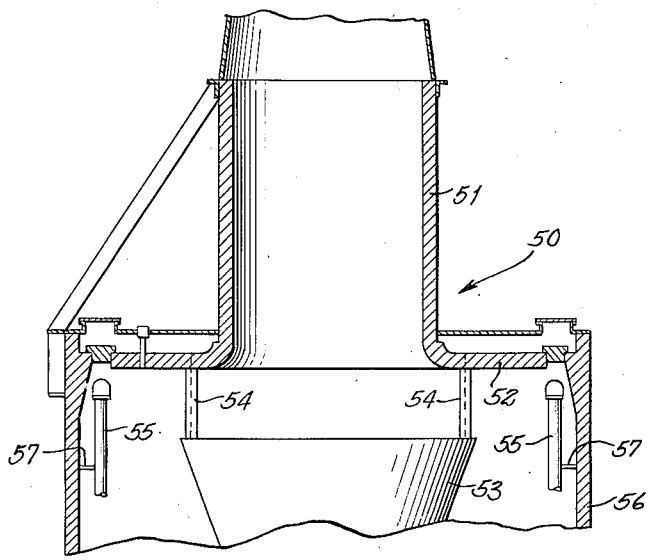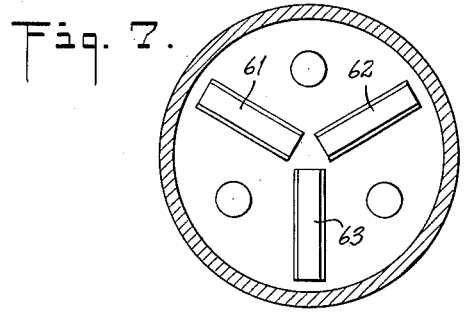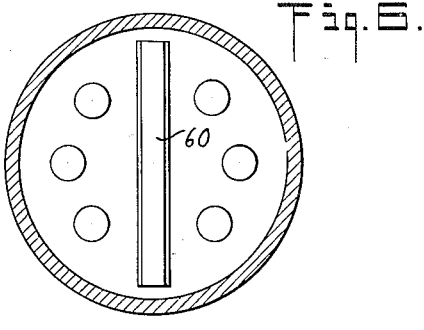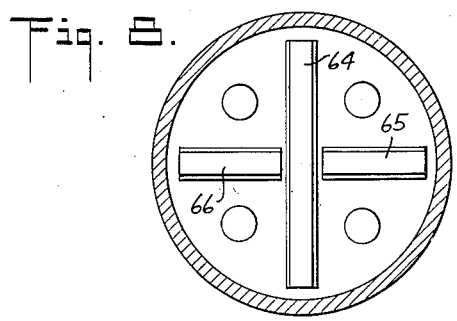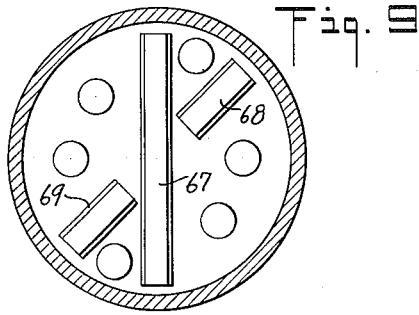

United States Patent Office 2,791,987
Patented May 14, 1957

2,791,987

MULTI-COIL HEAT CONTROL FURNACE

John W. Throckmorton and John S. Wallis, New York, N. Y., assignors to Petro-Chem Process Company, Incorporated, New York, N. Y., a corporation of Delaware Application June 23, 1955, Serial No. 517,546

4 Claims. (Cl. 122—356)

The economy of vertical tube heaters having a cylindrical combustion chamber with upshot burners in a bottom wall and a single row of heater tubes located close to the side walls of the chamber and arranged in a cylindrical bank so that the hot flame extends vertically within the chamber and the heat is largely imparted to the tubes by radiation, and only a small part by convection, has long been demonstrated and our U. S. Patent No. 2,276,527 illustrates an example of this type of heater.

The present invention has for one of its objects to provide a unitary furnace structure which has all of the advantages and economies of the very large heaters of the vertical tube type above described, but which nevertheless may be substituted successfully for two or three or even more separate heaters, such as are employed in oil processes of which the catalytic reforming process is an example.

Such a process involves preheating the charge to a prescribed temperature, then the charge flows to a catalytic reaction chamber. The charge is subsequently reheated and flows to a second catalytic chamber; is subsequently reheated and flows to a third catalytic chamber. As the run progresses, the catalyst in the various reaction chambers will have varying degrees of effectiveness and the duty in each furnace bears a relationship to the effectiveness of the catalyst. It is an object of our invention to have these coils in a unitary furnace but at the same time be able to vary the heat absorption between the coils over relatively wide ranges since this heat absorption may have one distribution between coils at the beginning of the run and a totally different heat absorption between coils at the end of the run.

An important object of our invention is to have a furnace with independently controllable heat absorption coils through the radiant section of the furnace. To accomplish this objective, we propose to use bridgewalls at the base of the furnace so that each coil has its own separately fired compartment and, in addition, to use a conical baffle at the top of the furnace so that by use of the conical baffle, and the separately fired segments between the bridgewalls, we will be enabled to obtain a high degree of variation in the heat absorption between coils while still maintaining the same furnace efficiency.

Another object of this invention is to segregate a combustion chamber only at the hottest part of the furnace so as to produce independently controlled furnace sectors, each having an appropriate number and size of burners.

Another object is to cool the furnace walls at the top where they join the stack.

Our invention will be more readily understood by reference to the accompanying drawings illustrating one embodiment and also variations in the fire wall baffle arrangement, in which:

Fig. 1 is a sectional elevation of a complete heater embodying the invention.

Fig. 2 is a plan view partially in section taken along the line 2—2 of Fig. 1.

Fig. 3 is a cross-section of the heater on the line 3—3 of Fig. 1.

Fig. 4 is a sectional elevation showing in detail the upper portion of the heater where the combustion chamber joins the stack.

Fig. 5 is a sectional elevation of the upper end of a furnace which has a modified arch construction well adapted for use on large size furnaces.

Figs. 6, 7, 8 and 9 are modified arrangements of the fire wall baffles which may be substituted for that shown in Fig. 3.

Referring to Figs. 1 to 4, inclusive, of the drawings, the vertical tube heater illustrated comprises a cylindrical metal shell 10 having a lining 11 of fire brick or the like mounted on a circular bottom plate 12 which is supported by structural steel legs 13 preferably fire-proofed by cement or concrete, as indicated at 14.

The bottom plate 12 supports a plurality of burners 15, 15–a, 16, 16–a and 17. The bottom plate is heavily coated with a layer of a concrete mix as indicated at 18, the plate and the concrete constituting the bottom wall of the furnace, which is designated 19.

Near the circumference of the bottom plate is located a tube sheet 20 and within the heater are a plurality of vertical tubes formed into a cylindrical bank near the inner wall of the combustion chamber and composed of three coils, 21, 22 and 23, formed in the usual way by return bends 30 at the bottom and top of the heater. The return bends at the bottom rest on the bottom tube sheet 20, which supports the entire weight of the tubes. The tubes are held in position at the top by brackets 31 which are mounted on the furnace wall at the top and are loosely bolted to the return bends of the tubes to permit upward expansion, while holding the tubes in position in the cylindrical bank.

The hollow frusto-conical cover plate 32 is mounted on the furnace at the top, being attached to the shell at spaced points so that there is an air space opening as indicated at 33 on Fig. 4. The usual stack having a frusto-conical section 34 and a cylindrical section 35 completes the furnace at the top.

A large conical baffle 36 is hung with its apex downward in the center of the combustion chamber by cone hangers 37 which are attached at spaced points around the upper periphery of the frusto-conical cover plate 32 as clearly shown in Fig. 1.

The base of the cone, located at the top of the heater, is somewhat smaller in diameter than the cylindrical tube bank and leaves a narrow annular space at the top of the tubes through which the hot gases pass from the combustion chamber into the stack. The conical baffle extends downward approximately half way to the bottom wall of the heater.

Mounted on the bottom wall are two fire wall baffles 38 and 39, preferably of solid fire brick construction and thicker at the lower half and reduced in thickness at the upper half for strength and economy. The two fire wall baffles are distinct, being slightly separated from one another at the closest point as shown in Fig. 3.

The fire wall baffles 38 and 39 extend upward about half the height of the heater and close to the apex of the conical baffle 36. The fire wall baffles as clearly shown in Figs. 1 and 3 segregate the lower half of the furnace into separate furnace sectors which for convenience are marked 40, 41 and 42. Sector 40 has two burners 15, sector 41 has two burners 16 and sector 42 is smaller and has one burner 17.

It is pointed out that the separation between the three sectors 40, 41 and 42 above the fire wall baffles, is greatly aided by the presence of the conical baffle 36. This is inherent in the shielding effect gained by the presence of this centrally located baffle which also becomes heated and reradiates heat only into that sector facing a given surface thereof on the side of the cone toward such given sector.

The coil 21 is composed of a series of interconnected tubes which are primarily heated by the burners 15 and by heat reflected from the adjacent side of the fire wall baffle 38. A separate coil 22 is formed by interconnecting the tubes in the furnace sector 41, which are heated by burners 16 and by the heat reflected from the adjacent walls of the fire wall baffles 38 and 39, and the coil 23 is formed by interconnecting the tubes in furnace sector 42, and they are heated primarily by burner 17 and the heat reflected from the two adjacent walls of baffles 38 and 39.

The furnace is so designed that there are no tubes located at the ends of the fire wall baffles and hence the coils are somewhat spaced apart in the specific example shown. The coil 21 is adapted to constitute the primary heater of a catalytic reforming unit for the manufacture of high octane gasoline and coils 22 and 23 are adapted to constitute reheater coils of a lesser heat capacity as is normally required in such a process.

Each coil has its independent inlet and outlet and the burners of each furnace sector are adapted to be adjusted independently of the burners in the other sector, so that independent heat control for the several coils is provided.

It will be observed that the coils nevertheless are built into a unitary furnace structure of compact and commercial design and the hot gases which have imparted maximum radiant heating effect to the tubes in the furnace sectors are guided by the conical baffle outwardly into contact with the tubes toward their upper ends, and thus a substantial amount of heating is accomplished by convection at this point.

Finally the gases which have given up a large portion of their total heat, are mixed with air admitted through the air space openings 33, hence the frusto-conical cover plate 32 is kept from overheating. It is preferable, however, to also add insulation to the inside surface of the cover plate 32, as shown at 43.

Referring to Fig. 5 the top of the furnace here shown has an arch 50 in the form of a vertical cylinder 51 with a horizontal flange 52.

A conical baffle 53 is somewhat smaller relative to the size of the furnace, but corresponds to baffle 36 of Fig. 1, and is supported from the arch 50 by hangers 54. The heating tubes 55 are arranged in a hollow cylindrical bank and are supported from the furnace wall 56 by guides 57.

While the arrangement of furnace baffles illustrated in Figs. 1 and 3, is particularly arranged and adapted for the purpose indicated, it is entirely feasible to adapt the heater for use in a two-coil process by employing a single furnace baffle arranged substantially as shown in Fig. 5.

Likewise, the heater may be adapted for a three-coil system in which an equal number of tubes are employed in each furnace sector, the furnace baffle wall then being arranged with a single cross baffle 60, as shown in Fig. 6. Other arrangements providing three-coil furnace sectors formed by furnace baffles 61, 62 and 63, as in Fig. 7, four equal sectors by baffles 64, 65 and 66, as shown in Fig. 8, or four unequal sectors, two larger and two smaller formed by baffles 67, 68 and 69, as shown in Fig. 9, may be employed.

Other variations in the structure, without departing from the spirit of the invention, will be apparent to those skilled in the art and no limitations are intended other than those imposed by the appended claims.

We claim:
1. A sectionized vertical tube heater having a hollow cylindrical combustion chamber with a cylindrical bank of vertical tubes adjacent to the side walls thereof and including a bottom wall, comprising a conical baffle depending apex downward from the top of said chamber for directing the products of combustion toward the periphery thereof, said apex lying substantially along the vertical axis of said chamber, a fire wall baffle supported by the bottom wall, said fire wall extending across the center of the chamber and close to the apex of said conical baffle to divide the combustion chamber into sections, and independently controllable burners for the several furnace sections, said burners being located spaced radially between the axis of said chamber and the tubes of said bank.

2. A sectionized vertical tube heater having a hollow cylindrical combustion chamber with a cylindrical bank of vertical tubes adjacent to the side walls thereof and including a bottom wall, comprising a conical baffle depending apex downward from the top of said chamber for directing the products of combustion outward from the center of the chamber toward the periphery thereof, said apex lying substantially along the vertical axis of said chamber and extending down more than half way to the bottom wall, a plurality of fire wall baffles supported by the bottom wall, said fire walls extending radially from said vertical axis and close to the apex of said conical baffle to divide the combustion chamber into sections, and independently controllable burners for the several furnace sections, said burners being located spaced radially between the axis of said chamber and the tubes of said bank.

3. A sectionized vertical tube heater having a hollow cylindrical combustion chamber with a cylindrical bank of vertical tubes adjacent to the side walls thereof and including a bottom wall, comprising a conical baffle depending apex downward from the top of said chamber for directing the products of combustion outward from the center of the chamber toward the periphery thereof, said apex lying substantially along the vertical axis of said chamber and extending down approximately half way to the bottom wall, a plurality of fire wall baffles supported by the bottom wall, said fire walls extending radially from said vertical axis and close to the apex of said conical baffle to divide the combustion chamber into sections, and independently controllable burners for the several furnace sections, said burners being located spaced radially between the axis of said chamber and the tubes of said bank, the tubes of said bank being interconnected into separate heater units corresponding to the furnace sections formed by the fire wall baffles.

4. A sectionized vertical tube heater having a hollow cylindrical combustion chamber with a cylindrical bank of vertical tubes adjacent to the side walls thereof and including a bottom wall, comprising a conical baffle depending apex downward from the top of said chamber for directing the products of combustion outward from the center of the chamber toward the periphery thereof, said apex lying substantially along the vertical axis of said chamber and extending down approximately half way to the bottom wall, a fire wall baffle supported by the bottom wall, said fire wall extending diametrically across the chamber and upward close to the apex of said conical baffle to divide the combustion chamber into sections, a detached radial fire wall baffle supported by the bottom wall and reaching close to the middle of said first named fire wall to subdivide the combustion chamber into sections to different sizes, and independently controllable burners for the several furnace sections, said burners being located spaced radially between the axis of said chamber and the tubes of said bank.

References Cited in the file of this patent
UNITED STATES PATENTS

| 2,276,528 | Throckmorton et al. | Mar. 17, 1942 |
| 2,330,188 | Barnes | Sept. 28, 1943 |
| 2,625,916 | Barnes | Jan. 20, 1953 |